Patented June 30, 1931

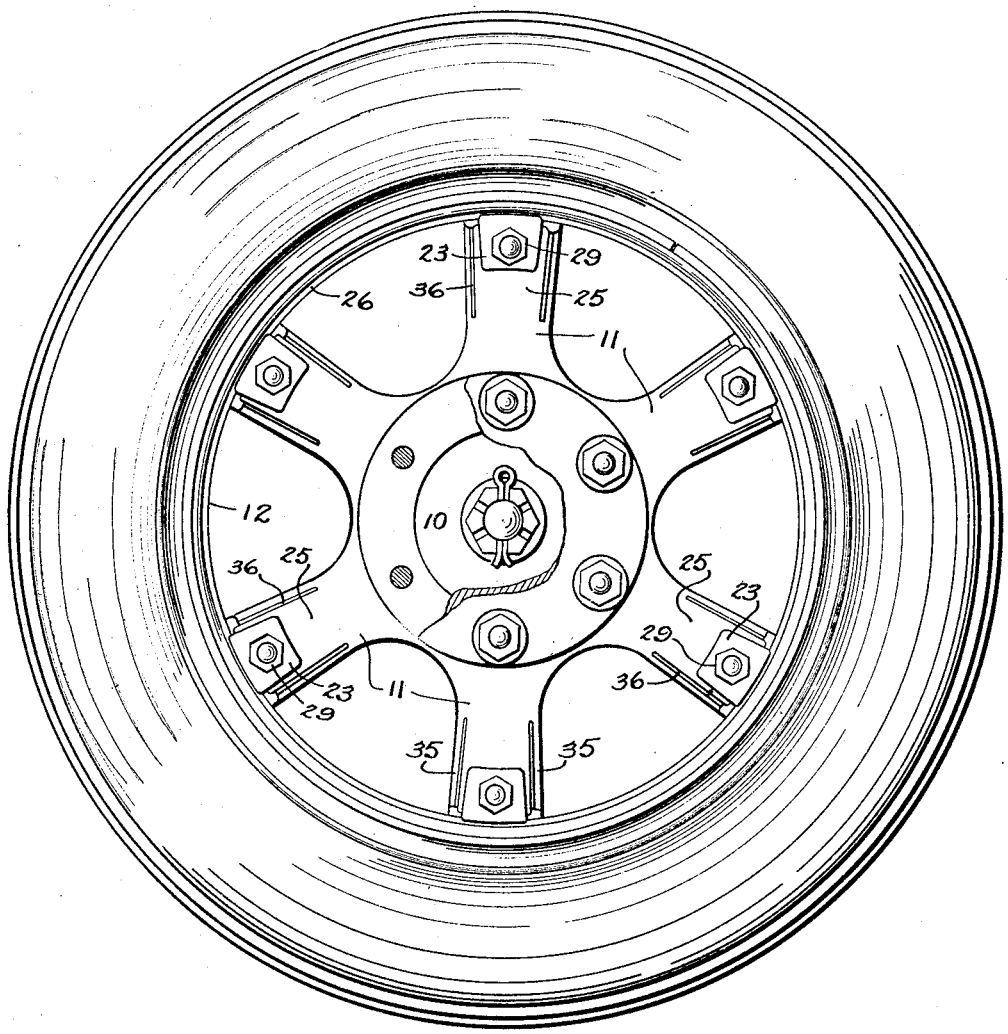

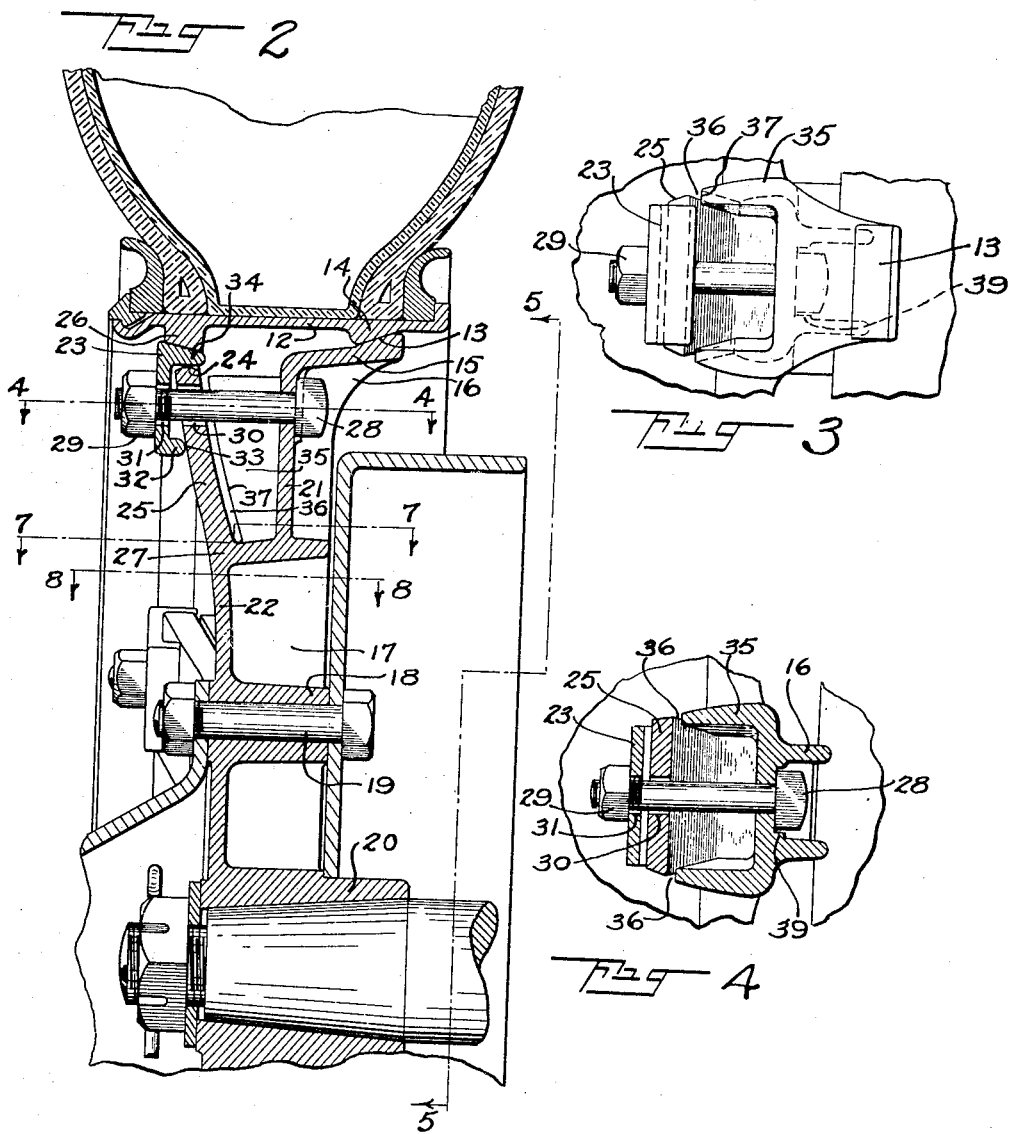

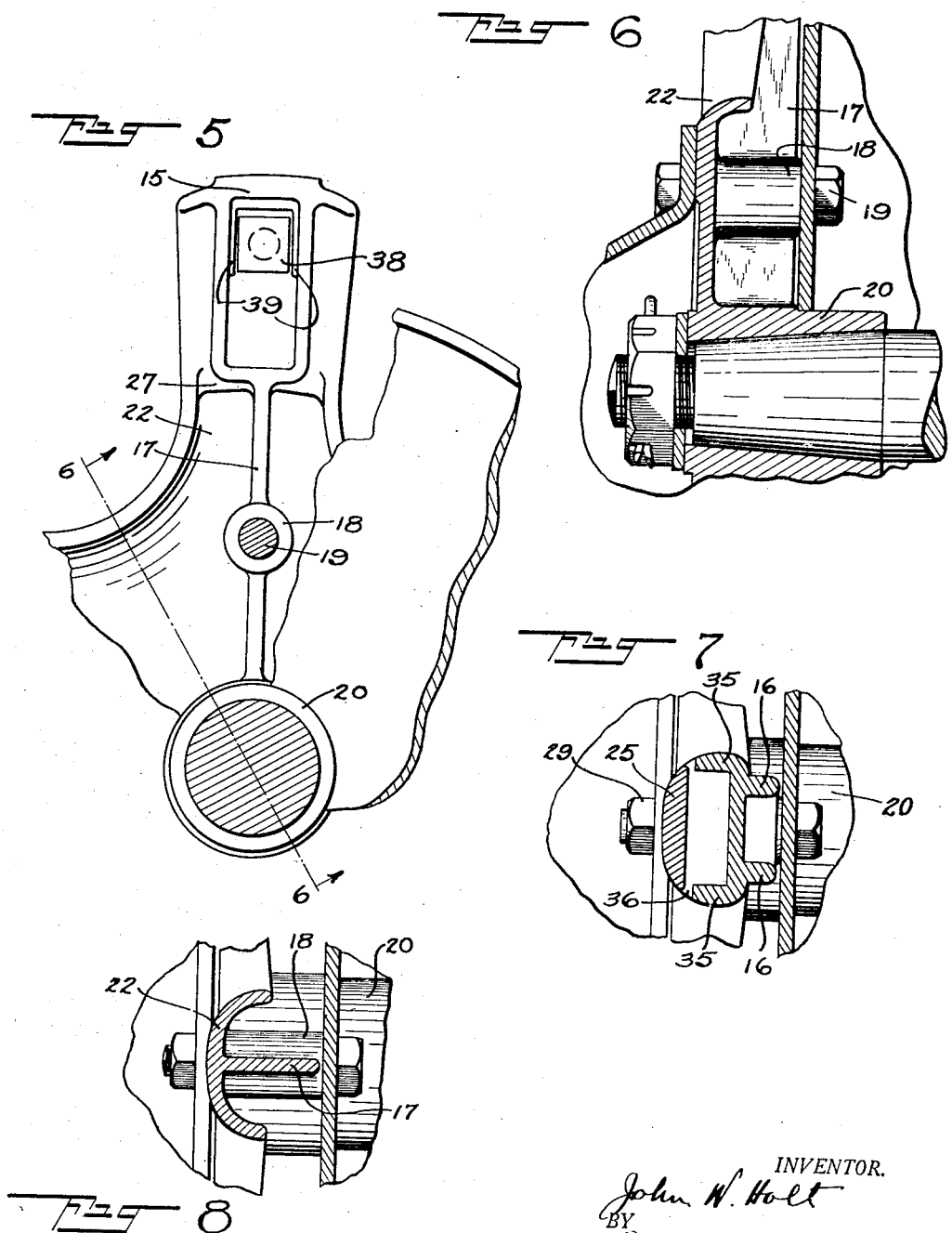

1,812,337

UNITED STATES PATENT OFFICE

JOHN W. HOLT, OF CLEVELAND, OHIO

VEHICLE WHEEL CONTRUCTION

Application filed June 3, 1926. Serial No. 113,363.

My invention relates to the construction of wheels for road vehicles of the automotive type, and has for an object the provision of a wheel structure having a simplified formation coupled with improved means for gripping the tire supporting rim in operative position. With these and other objects in view the invention comprises a wheel structure in which the tire rim is mounted directly on the ends of the spoke members, thereby eliminating the usual felloe band and correspondingly simplifying the construction. Another feature of the invention resides in the provision of a resilient strut member forming part of the spoke structure which is arranged to support a rim-engaging wedge clip member and to exert a powerful gripping action, through the clip, on the engaged rim. Other features of the invention will be hereinafter described and claimed.

Fig. 1 is a view in elevation of a vehicle wheel embodying the invention, parts being broken away to show normally covered details; Fig. 2 is a transverse vertical section on an enlarged scale of a portion of the wheel structure shown in Fig. 1; Fig. 3 is a top plan view of the parts shown in Fig. 2 with the tire and rim removed; Fig. 4 is a view in horizontal section taken on the line 4—4 of Fig. 2; Fig. 5 is a view partly in rear elevation and partly in section taken on the line 5—5 of Fig. 2; Fig. 6 is a sectional view taken on the line 6—6 of Fig. 5; Fig. 7 is a horizontal sectional view on the line 7—7 of Fig. 2; and Fig. 8 is a view in horizontal section taken on the line 8—8 of Fig. 2.

Referring to the drawings for a more detailed description of the invention, in Fig. 1 there is shown a vehicle wheel constructed in accordance with the present invention and which shows a hub assembly 10 provided with spoke members 11 to the outer ends of which the tire supporting rim member 12 is directly attached. The direct seating of the tire supporting rim member 12 on the outer ends of the spoke members 11 eliminates the use of a felloe band structure, such as is ordinarily used, and correspondingly simplifies and lessens the cost of production of the wheel structure as a whole.

The integrally formed hub section 10 and spoke members 11 may be conveniently produced in a metal casting operation and the outer ends of the spoke members are suitably machined at 13 to provide inclined seats against which the complementary formed bead 14 on the rim member 12 seats when the rim member is clamped into position on the outer end of the spokes. The seating surface 13 is formed on a bracket structure 15 supported and reinforced by a pair of separated rib or flange members 16, which merge at their lower extremities into a single flange member 17 which is expanded at 18 to provide a seat for a brake drum supporting bolt 19 and which merges at its lower end with the hub member 20. The flange members 16 and 17, referred to, are integrally united at their outer edges with web members 21 and 22 which form the main body structure or framework of the wheel construction. It will be seen that a rigid supporting structure is formed by the use of the flange and web members referred to of the bracket structure 15 on which is provided the seat 13 for the tire supporting rim member 12.

In order to force the tire supporting rim member 12 to its seat in engagement with the inclined faces 13 of the bracket members 15, a wedging member 23 is provided which is adapted to be forced between the upper rounded extremity 24 of a strut member 25 and bead or reinforcing member 26 formed on the rim member 12. The strut member 25 is integrally united at its lower extremity 27 with the main body portion of the wheel structure. The wedging member 23 is forced to its position between the upper extremity of the strut member 25 and the bead member 26 by means of a bolt 28 and a nut 29, the bolt being passed through the web member 21 and through an enlarged opening 30 formed in the strut member 25 and thence through a correspondingly enlarged opening 31 formed in the wedging member 23. The lower extremity of the wedging member 23 is provided with a lug 32 which is adapted to bear against the outer face of the strut member 25. The lug member 32 bearing against the strut at 33, prevents the wedge member from canting inwardly at its lower end when it is being drawn into position between the bead 26 and the rounded end 24 of the strut member.

A feature of the invention resides in the special construction and functioning of the strut member 25. As has already been pointed out, the strut member 25 is attached only at its lower end to the wheel framework so that it is adapted to be placed under stress by the action of the bolt 28 and nut 29 after forcing the wedging member 23 to operating position. This structural arrangement has a two-fold function. In the first place, the flexing of the strut member, by the tightening of the nut 29, produces a powerful gripping or expanding effect outwardly against the rim member 12. This action takes place after the wedge member 23 has been brought into tight wedging engagement with the bead 26 and the rounded end 24 of the strut member. A further tightening of the nut 29 causes the wedge member 23 to exert a powerful inward pressure against the strut member 25, which due to its flexibility, is forced inwardly and to the right, as shown in Fig. 2 of the drawings; at the same time transmitting a component of this force radially outward, against the rim member 12 through the portion 34 of the wedge member.

The other function of the strut member 25 resides in the powerful tendency which is exerted by the deflected strut member in operative position to force the wedging member 23 from its holding position when the nut 29 is loosened preparatory to removing the rim member 12 from the wheel. The automatic or self-freeing of the wedging member when the holding nut is removed obviates the usual work of prying or hammering ordinary wedging clips from their position when they have become rusted and fastened in their locking position. The action of the struts to effect the freeing of the wedging members associated therewith actually results in a freeing of the rim from its inner seats. It will be found that when a wheel is constructed in accordance with the principles of my invention the securing bolts may be loosened until the last or last two bolts only remain tight; then, when such bolts are freed the struts will snap the wedges free and the rim will be simultaneously dislodged from the inner seats.

In order to prevent an inward tightening movement of the strut member 25 to a position which will exceed its elastic limit, a pair of limiting or stop members 35 are provided which are so located as to be engaged by the opposite edge portions of the strut member 25 in the event that the strut member is bent inwardly beyond its maximum position. Spaces 36 provided between the outer edges 37 and the inner faces of the strut member 25 serve as a guide to the operator in forcing the wedging member into position since the operator can thus observe the relative position of the wedging member with relation to the stop members 36 and thereby obviate movement of the strut member beyond a desirable limit.

The stop members 35, in addition to serving as limiting members for the strut member 25, also serve to provide a more attractive appearance to the outer ends of the spoke members by enclosing the space which exists between the strut 25 and the web member 21 of the wheel structure.

It will be seen that the oversize of the openings 30 and 31 in the strut and wedge members, respectively, prevents any possible binding of the bolt with the engaged parts. Preferably the inner face of the web member 21 is provided with spaced apart rib members 39 which engage opposite edges of the head 38 of the bolt 28 to prevent turning of the bolt in drawing the parts to operative position.

In the operation of mounting the rim 12 on the ends of the spoke members, the wedging members 23 are removed from their positions and the rim is slipped over the ends of the spokes to seat the inclined surfaces 14 of the rim against the inclined faces 13 on the bracket extensions 15. The wedging members 23 are then placed in position and the nuts 29 are tightened up. The initial tightening action is to wedge the portions 34 of the wedging members between the ends of the strut members 25 and the seat 26 on the rim. This wedging action continues as the nuts are tightened until the rim is locked in place on the spokes. Further tightening of the nuts deflects the strut member 25 inwardly, the strut member and the wedging member accordingly moving inwardly together. The strut member being inclined outwardly exerts a powerful expanding action upon the rim as the strut member is sprung inwardly during the last part of the tightening operation. There is thus provided a compound locking action upon the rim, one component being the true wedging action of the portion 34 being forced into place by the action of the bolt, and the other factor being the additional wedging action produced by the sprung condition of the strut member which acts to produce a final powerful and resilient gripping action upon the rim. In removing the rim, it will be seen that the first action, as the nut is loosened, is for the strut member to spring back to its original position, thereby breaking the grip between the wheel structure and the rim.

It will thus be seen that a simplified wheel structure has been provided in which the usual felloe band has been done away with. In addition, an improved gripping action on the rim is provided by the use of the resilient strut supporting member for the wedging device.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a vehicle wheel construction, a rim, spoke members having their terminal portions formed at their inner sides with inclined rim-receiving seats, and compound wedging means carried by the outer portions of the spoke terminal portions for forcing the rim into engagement with the seats, one portion of said compound wedging means being flexible, and extending at an angle to the plane of the wheel to exert an expanding force on the rim upon movement toward the plane of the wheel.

2. In a vehicle wheel construction, a rim, spoke members having their terminal portions formed at their inner sides with inclined rim-receiving seats, flexible strut members formed at an angle to the spokes on the outer sides of the spoke terminal portions, and wedging means carried by the strut members for forcing the rim into engagement with the seats.

3. In a vehicle wheel construction, a rim, spoke members having their terminal portions formed at their inner sides with bracket extensions provided with inclined rim-receiving seats, flexible strut members extending at an angle to the plane of the wheel to exert an expanding force on the rim upon movement toward the plane of the wheel having their lower extremities formed integrally with the wheel structure at their lower ends, said strut members being located at the outer sides of the spoke members and spaced apart from the bracket members, wedging members having inwardly extending lugs at their lower ends adapted to engage the outer faces of the strut members and wedging portions at their upper ends adapted to pass between the upper extremities of the strut members and the rim, and clamping means engaging the outer faces of the wedging members for rocking the wedging members about the points of engagement of the lugs with the strut members for forcing the wedging portions of the members into locking position.

4. In a vehicle wheel construction, a rim, spoke members having their terminal portions formed at their inner sides with bracket extensions provided with inclined rim-receiving seats, flexible strut members extending at an angle to the plane of the wheel having their lower extremities formed integrally with the spoke structure at their lower ends, said strut members being located at the outer sides of the spoke members and spaced apart from said bracket members, wedging members having inwardly extending lugs at their lower ends adapted to engage the outer faces of the strut members and wedging portions at their upper ends adapted to pass between the upper extremities of the strut members and the rim, clamping bolts passing through the bracket members, strut members and wedging members for drawing the wedging members into rim-locking position, said strut members being adapted to be deflected inwardly under the tension of the bolts whereby to exert spring tension on the wedging members to assist in the wedging action thereof, and stop members arranged to limit the inward deflection of said strut members.

5. In a vehicle wheel construction, a rim, seating at one side on a part rigid with the wheel structure and supported at the other side by a part flexible with respect to the wheel structure extending at an angle to the plane of the wheel, a wedging member associated with said flexible part to hold the rim in engagement with the wheel structure, said wedging member being arranged to move into rim locking position independently of the flexible part.

6. In a vehicle wheel construction, a rim, spoke members having their ends formed at their inner sides with bracket extensions provided with inclined rim-receiving seats, rim clamping means carried by the outer side of the spoke terminal portions, said means comprising a strut member and a wedging member interposed between a portion of a spoke member and the rim, a portion of the strut member extending at an angle to the plane of the wheel whereby to exert an expanding force on the rim upon movement toward the plane of the wheel, and said wedging member being interposed between an end of the strut member and the rim and being arranged to exert an expanding force on the rim to combine with the expanding action of the strut.

7. In a vehicle wheel construction, a rim, spoke members having their terminal portions formed at their inner sides with inclined rim receiving seats engaging the rim, outwardly inclined flexible strut members formed integrally with the wheel structure at the outer sides of the spoke members, separate wedging members carried by the extremities of the strut members for engagement with the rim and a clamping bolt extending through each wedging member and strut member to force the wedging member to locking position and to flex the strut member to rim tightening position.

8. In a vehicle wheel construction, a rim having outer and inner inclined seats, spoke members having terminal portions formed at their inner sides with inclined rim receiving seats engaging the inner rim seats and outwardly inclined flexible strut members engaging the outer rim seat, the inclination of the strut member being such that flexure thereof inwardly will force the rim onto its rim receiving seats and whereby flexure of the flexible strut member outwardly will tend to carry the rim off from its rim receiving seats.

9. In a vehicle wheel construction, a rim having outer and inner inclined seats, spoke members having their terminal portions formed at their inner sides with inclined seats engaging the inner rim seats and having outwardly inclined flexible strut members formed integrally with the wheel structure at the outer sides of the spoke members, separate wedging members carried by the extremities of the strut members for engagement with the outer rim seats and a clamping bolt extending through each bracket member and a strut member to engage and force the wedging members to locking position and to flex the strut members to rim tightening position, whereby when the bolts are loosened the wedging members will be carried away from the locking position and the rim consequently freed from its seats.

JOHN W. HOLT.